May 27, 1952 H. F. KENNISON 2,597,934
APPARATUS FOR MOLDING CONCRETE PIPES
Filed July 15, 1949 5 Sheets-Sheet 1

INVENTOR.
HUGH F. KENNISON
BY Robert S. Dunham,
ATTORNEY.

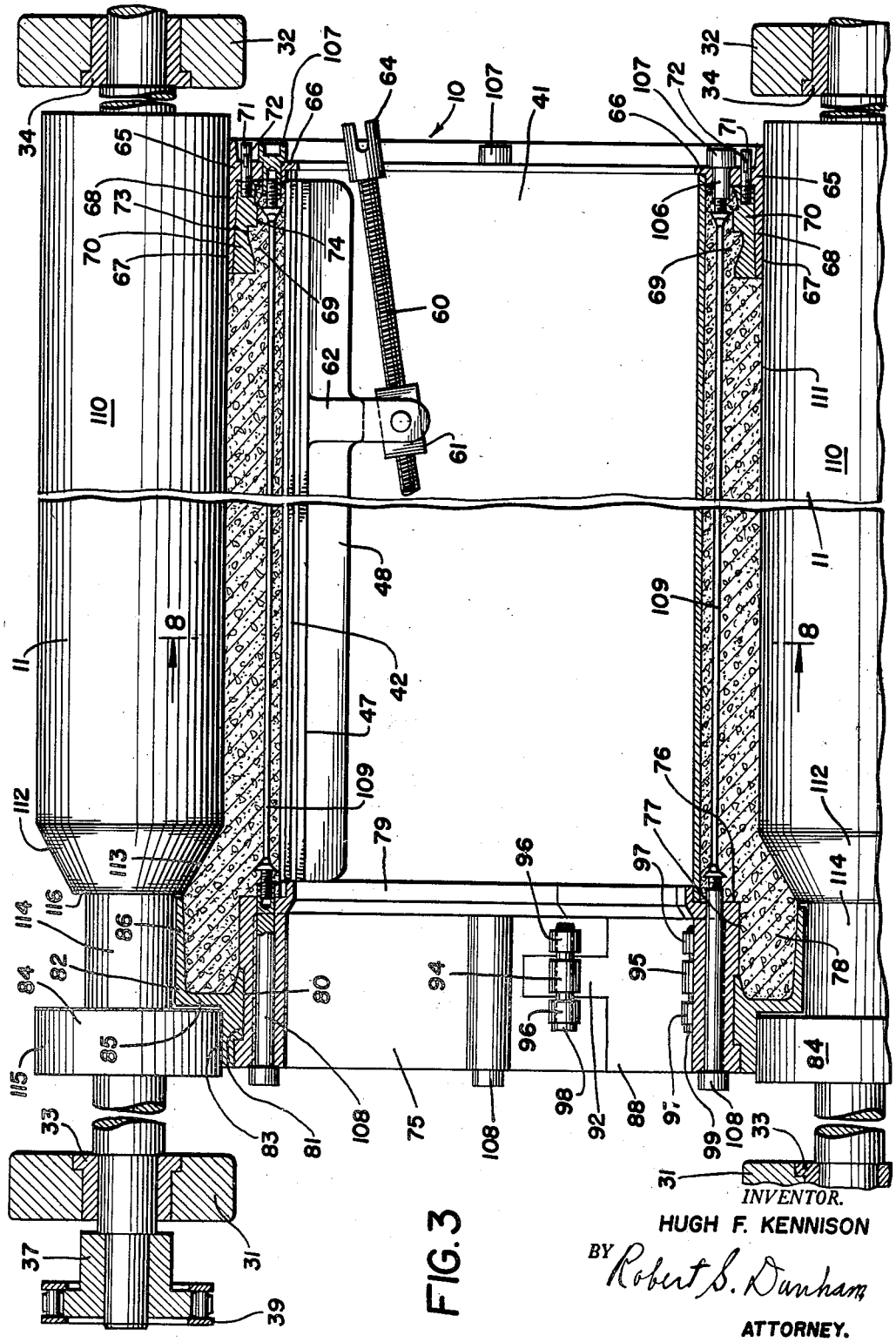

May 27, 1952     H. F. KENNISON     2,597,934
APPARATUS FOR MOLDING CONCRETE PIPES
Filed July 15, 1949     5 Sheets-Sheet 3
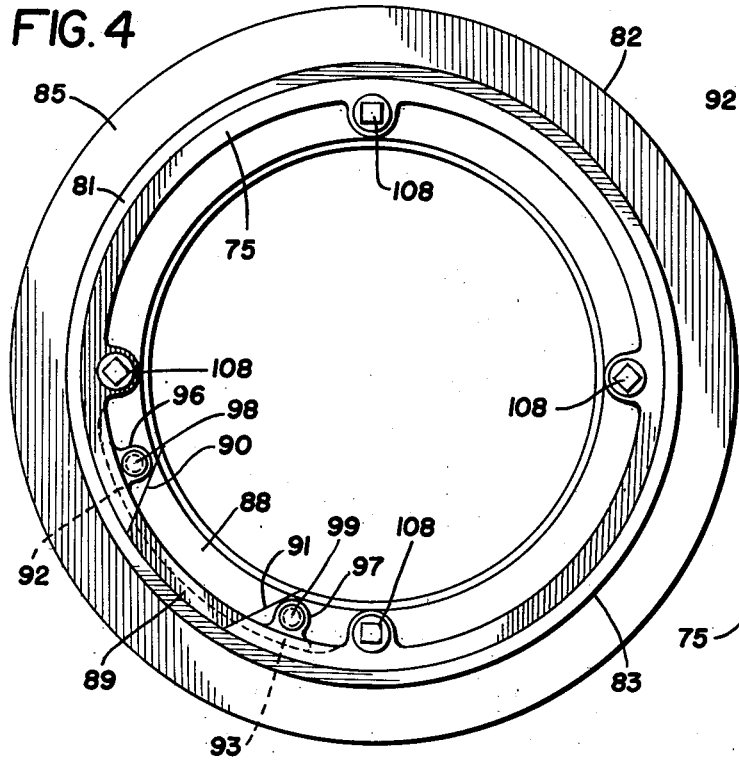
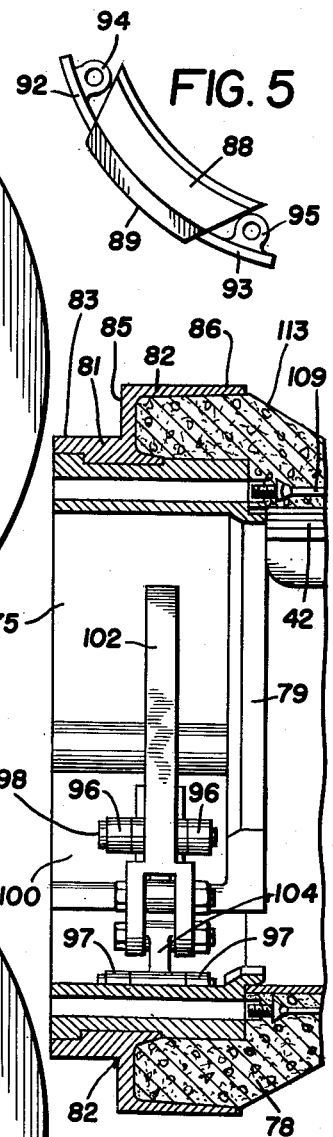
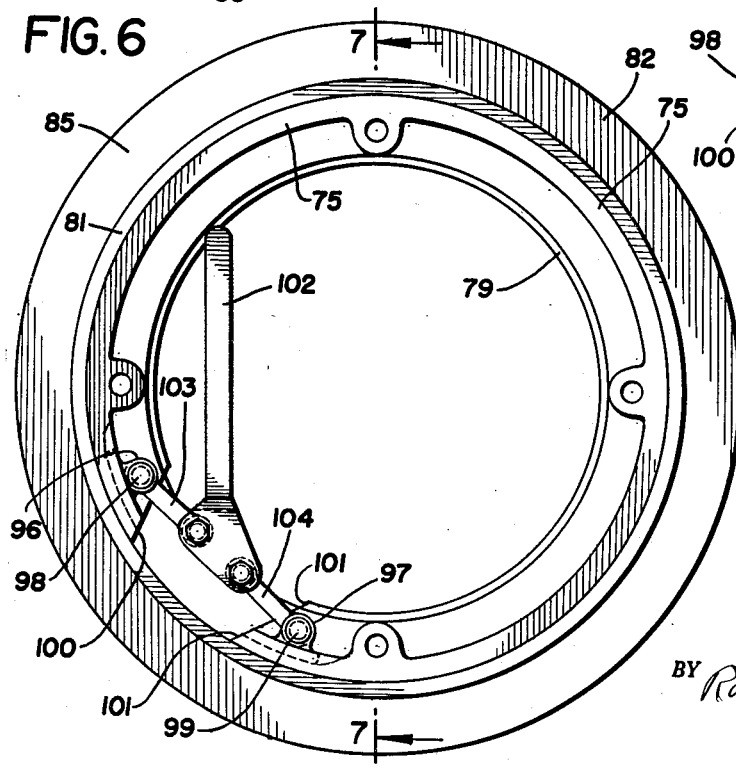
INVENTOR.
HUGH F. KENNISON
BY Robert S. Dunham
ATTORNEY.

May 27, 1952          H. F. KENNISON          2,597,934
APPARATUS FOR MOLDING CONCRETE PIPES
Filed July 15, 1949          5 Sheets-Sheet 4
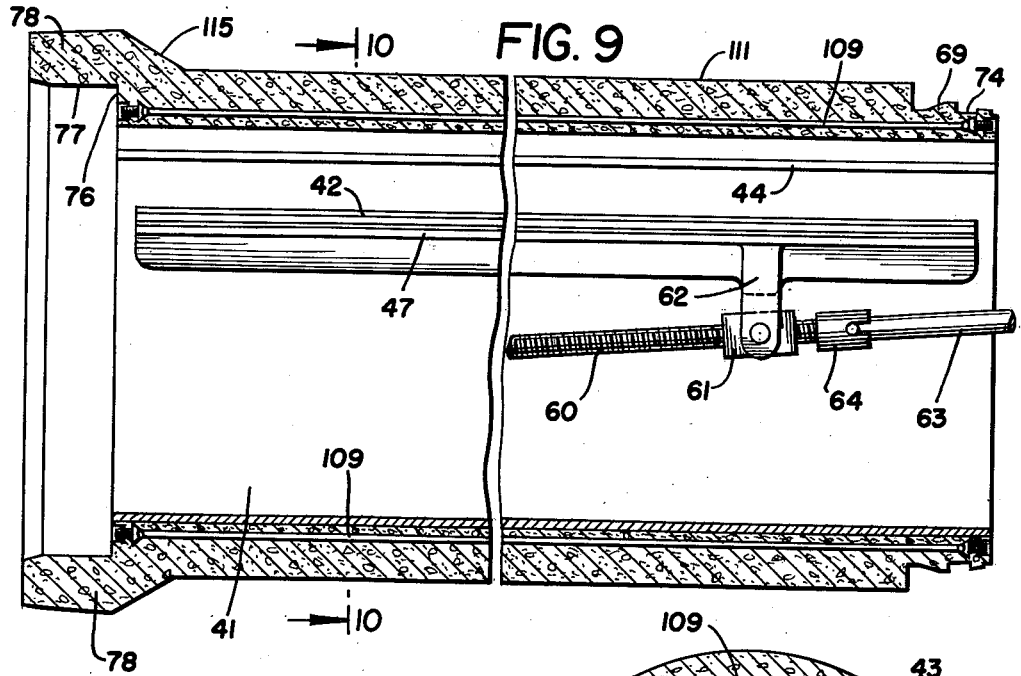
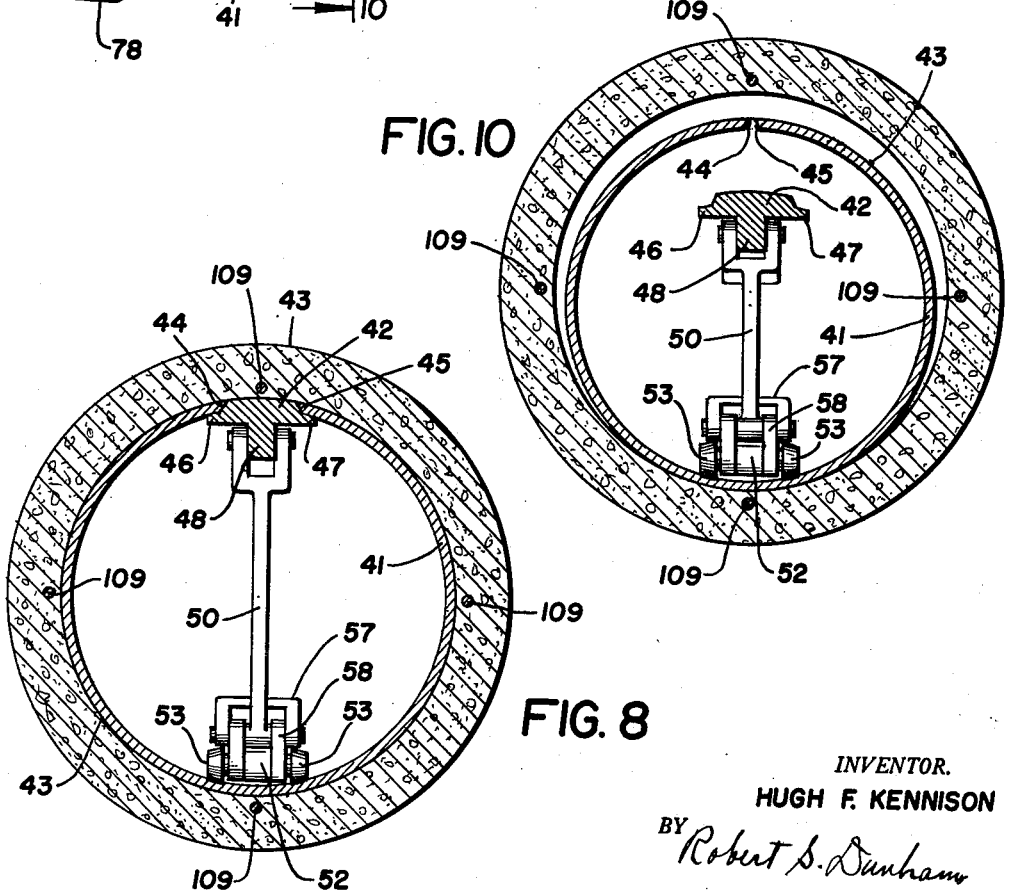
INVENTOR.
HUGH F. KENNISON
BY Robert S. Dunham
ATTORNEY.

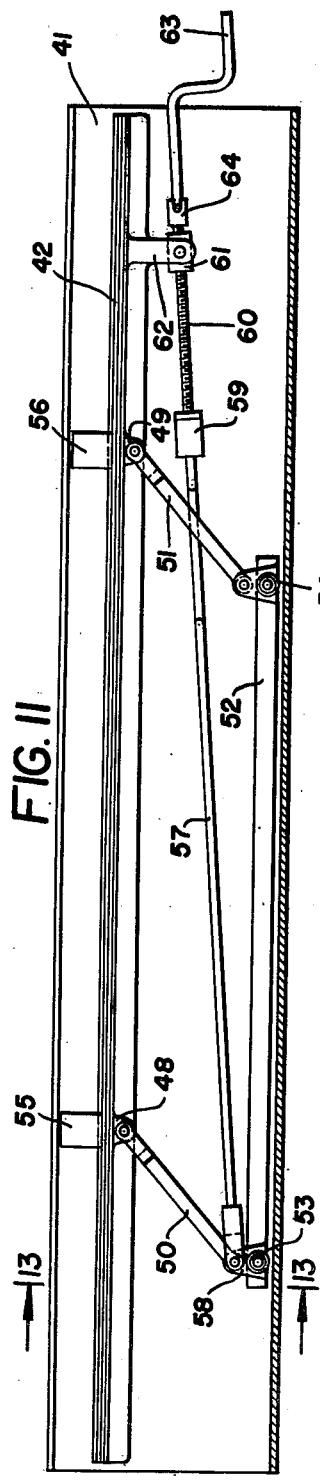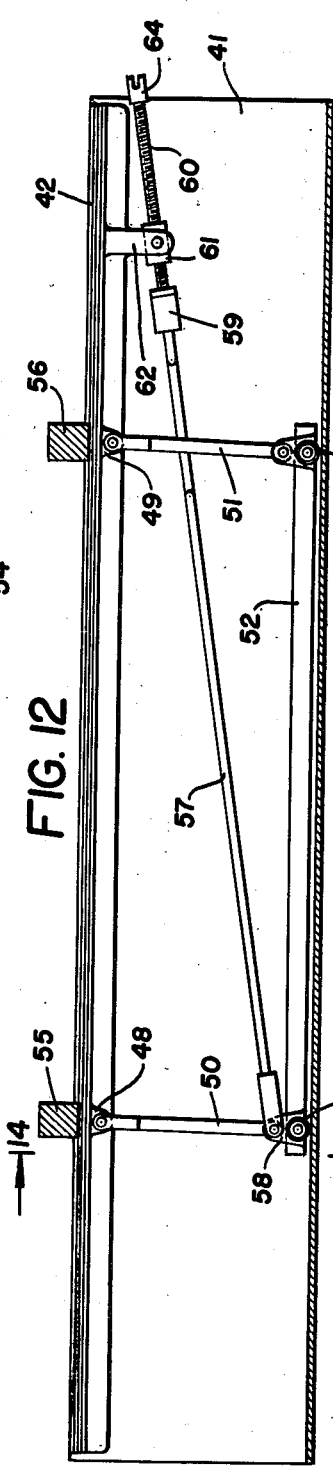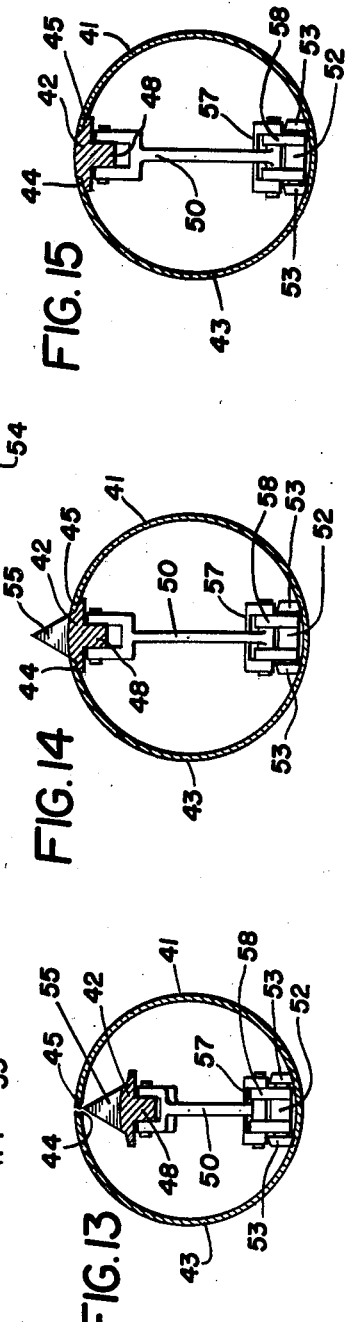

Patented May 27, 1952

2,597,934

UNITED STATES PATENT OFFICE 2,597,934

APPARATUS FOR MOLDING CONCRETE PIPES

Hugh F. Kennison, Verona, N. J., assignor to Lock Joint Pipe Company, East Orange, N. J., a corporation of New Jersey Application July 15, 1949, Serial No. 105,013

17 Claims. (Cl. 25—30)

This invention relates to apparatus for making concrete pipes with coupling ends. Among the objects of the invention is to provide an apparatus for making the pipe.

The apparatus of the present invention includes a rotatable mould for forming the interior of a pipe and the coupling members at the ends of the pipe, and a plurality of rollers which surround the mould and are provided with surfaces of revolution for forming the exterior portion of the pipe between its coupling members. The mould and the rollers are rotated on their respective axes as the concrete or other mouldable material is poured or dumped onto the exterior of the mould to form a monolithic pipe complete with coupling members. As the placing of the concrete continues, the concrete is highly compacted by the pressure exerted by the rollers surrounding the mould.

An object of the invention is to provide an apparatus of the kind described by which the joining surfaces of the coupling members may be accurately moulded and the coupling members formed as complemental members consisting of a bell and a spigot. The mould comprises a split cylinder or collapsible cylindrical shell with supporting and moulding rings at its ends. The rings provide annular moulding cavities which mould the bell and the spigot of the pipe. The bell and spigot may be plain-faced or provided with gasket-receiving grooves, as desired. In the apparatus illustrated in the accompanying drawings, the rings at the bell end of the apparatus form a bell with a plain cylindrical interior surface and the rings at the spigot end of the apparatus form a complementary spigot with a gasket-receiving groove in its exterior surface.

Referring to the drawings, Fig. 1 is an end view of an apparatus employing the principle of the present invention;

Fig. 3 is a longitudinal section through the mould and opposite rollers on line 3—3 of Fig. 1;

Fig. 4 is an end view of the inner mould as seen from the left of Fig. 3;

Fig. 5 is a detail of the removable segment of the collapsible ring shown in Fig. 4;

Fig. 6 is a view similar to Fig. 4 with the removable segment removed and a tool applied for collapsing the ring;

Fig. 7 is a sectional view on line 7—7 of Fig. 6;

Fig. 8 is a sectional view of the mould on line 8—8 of Fig. 3;

Fig. 9 is a longitudinal section of a pipe and the shell of the inner mould in a collapsed position;

Fig. 10 is a section on line 10—10 of Fig. 9;

Fig. 11 is a longitudinal section of the shell in collapsed condition and with means for expanding the shell;

Fig. 12 is a view similar to Fig. 11 and showing the inner shell expanded;

Fig. 13 is a cross-section on line 13—13 of Fig. 11;

Fig. 14 is a cross-section on line 14—14 of Fig. 12; and

Fig. 15 is a cross-section of the shell as conditioned for moulding.

Figure 1:
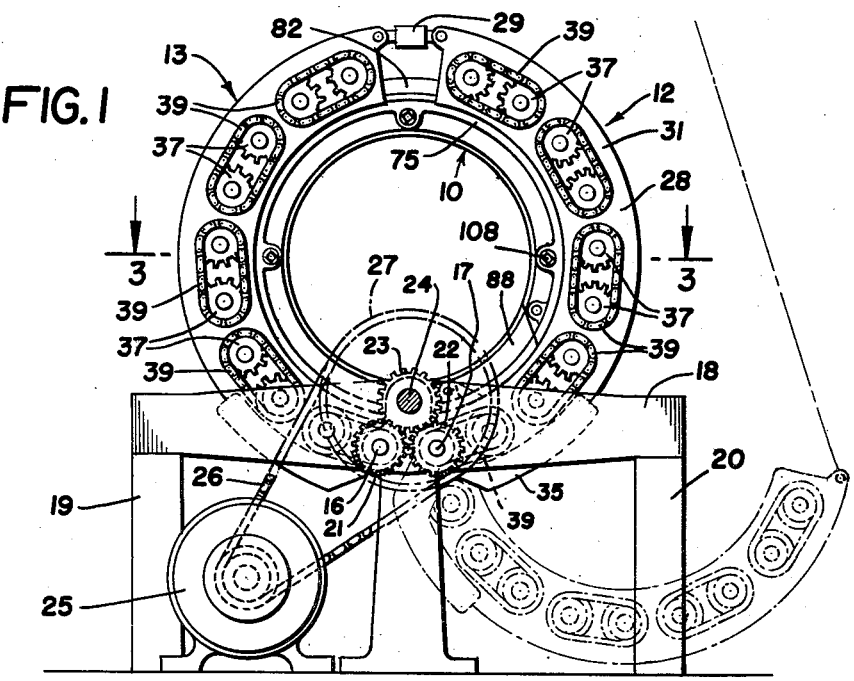

The apparatus illustrated in the drawings (Figs. 1 and 2) includes two complementary moulding mechanisms, one an inner mould 10 and the other a plurality of rollers 11 concentrically located outside of the inner mould and rotatably mounted in circular segments 12 and 13. The rollers form the exterior of the pipe to be moulded and in particular the portion of the pipe between the coupling members at the ends of the pipe. The end portions of the rollers are capable of rolling contact with the end portions of the inner mould during the moulding of a pipe, as will be explained hereinafter. The inner mould 10 and two of the several outside rollers 11 are illustrated on an enlarged scale in Fig. 3.

The inner mould is rotated by the rollers. It is supported on the two lowermost rollers 11 which are equally spaced from a vertical plane passing through the axis of rotation of the inner mould, Fig. 1. These two rollers are journalled in standards 14 and 15, one at either end of the apparatus, Fig. 2. The shafts 16 and 17 which extend from the two lowermost of the rollers 11 are journalled in bearings carried by a crossbeam 18. The cross-beam is supported by a pair of standards 19 and 20, Fig. 1. The shaft 16 carries a gear 21 and the shaft 17 carries a gear 22. These gears 21 and 22 mesh with a gear 23 which is carried by a shaft 24, journalled in bearings in the standard 14 and in the cross-beam 18. The shaft 24 is driven from a motor 25 through a sprocket and chain connection 26 which drives the sprocket wheel 27 mounted on the shaft 24. The gear 23 drives the gears 21 and 22 on the shafts 16 and 17, respectively. The inner mould 10 rests upon the two lowermost rollers 11 from which the shafts 16 and 17 extend and are rotated thereby.

The outer moulding mechanism comprises two segments 12 and 13, each segment embracing an equal number of rollers 11 located at opposite sides of the apparatus, Fig. 1. The segment 12 is pivotally supported on one of the lowermost rollers 11 to rock about the axis of the shaft 17, and the segment 13 is pivotally supported on the other of the lowermost rollers to rock about the axis of the shaft 16. In order to place the mould 10 within the apparatus it is necessary only to depress one of these segments as illustrated in Fig. 1. After the mould has been placed onto the two lowermost rollers 11, the depressed segment is raised and is secured to the segment 13 by any suitable means such as the turnbuckles 29 and 30.

Each segment includes an arcuate frame 31, an arcuate frame 32 and a set of rollers 11 on one side of the apparatus. The rollers are journalled in bearings 33 and 34 (Fig. 3) carried by the frame members 31 and 32, respectively. The bearings are so located as to support the rollers 11 concentrically with the axis of the mould 10 when the segments are closed about the mould. One pair of frame members 31 and 32 is carried by pairs of brackets 35 and 36 which are pivotally supported by the lowermost roller at one side of the apparatus. The segment 13 is similarly constructed with a set of rollers 11 supported by two frames which are pivotally supported by the lowermost roller at the other side of the apparatus. During a moulding operation the two segments 12 and 13 are held in operating relationship by the turnbuckles 29 and 30.

All of the rollers are rotated in the same direction. The lowermost roller in the segment 12 is driven from the shaft 24 through gears 22 and 23. Each of the rollers carries a sprocket wheel 37 at one end and a sprocket wheel 38 at its other end. The roller adjacent the lowermost roller in the segment 12 is driven through a sprocket chain 39 and a pair of sprocket wheels 37. Starting from the lowermost roller, every even-numbered roller of the segment is driven by the immediately preceding odd-numbered roller through a similar sprocket chain 39 and a pair of sprocket wheels 37 at one end of the segment, and every succeeding odd-numbered roller is driven from the immediately preceding even-numbered roller by a similar sprocket chain 40 and a pair of sprocket wheels 38 at the other end of the segment. Sprocket wheels and sprocket chains are similarly employed to rotate the rollers 11 in the other segment 13. The lowermost roller in the segment 13 is driven from the shaft 24 through the gears 21 and 23.

The inner mould comprises a longitudinally split cylinder or shell in the form of a curvilinear plate or shell 41 and an arch piece 42 which has a surface 43 in the form of an arc of the exterior cylindrical surface of the shell 41 when the shell is in expanded condition, as shown in Figs. 3, 8 and 15. The shell 41 is formed of steel and is rolled and shaped in such a manner as to be collapsed or constricted when unrestrained, as illustrated in Figs. 9, 10, 11 and 13. The arch piece is shaped to engage the edges 44 and 45 of the shell so as to provide an unbroken cylindrical form or mould having an outer diameter equal to the inner diameter of the pipe to be moulded. The arch piece is provided with flanges 46 and 47 which bear upon the interior of the shell when the arch piece is in seated position. The arch piece may be held in seated position to complete the circular section of the shell by any suitable means.

For placing and holding the arch piece in position the arch piece is provided with lugs 48 and 49 to which radius links 50 and 51, respectively, are pivoted, Figs. 11 and 12. These links 50 and 51 are connected together by a movable bar 52 on which a pair of rollers 53 is mounted opposite the link 50, and a pair of rollers 54 is mounted opposite the link 51. The arch piece 42 and the bar 52 constitute opposite sides of a parallelogram. When the shell 41 is in collapsed condition, the radius links 50 and 51 are angularly disposed with respect to the diameter of the shell, as illustrated in Fig. 11, and when the shell is in its expanded condition, the links 50 and 51 are disposed in substantially diametrical positions, as illustrated in Fig. 12. In this latter position, force is exerted through the rollers 53 and 54, the bar 52 and the links 50 and 51 to force the arch piece 42 into position for completing the circular form of the shell 41.

Since the normal tendency of the shell is to assume its collapsed condition, it is necessary to spread the edges 44 and 45 of the shell in order to insert the arch piece 42 in its proper position, Fig. 8. This may be accomplished by mounting steel wedge blocks 55 and 56 onto the exterior of the arch piece 42, preferably in positions above the pivots of the links 50 and 51, as illustrated in Figs. 11 and 13. The wedge blocks 55 and 56 may be magnetized in order to hold them centrally upon the arch piece. When the wedge blocks are mounted on the arch piece, the arch piece is moved towards the split between the edges 44 and 45 of the shell by moving the bar 52 in such manner as to dispose the links 50 and 51 in substantially diametric planes. As this is done, the wedge blocks 55 and 56 will spread the edges of the shell and permit the arch piece to be lodged in its seating position. The movement of the bar 52 may be accomplished by applying force to the bar or to the links. A rod 57 is pivotally connected to a bracket 58, carried by the bar 52, and a swivel joint 59 is fastened to its other end. One end of a screw 60 is rotatably held by the swivel joint and the screw is engaged by a nut 61 which has laterally extending studs for pivotally supporting the nut on a bracket 62 which projects from the arch piece. A crank 63 having means for engaging a socket 64 at the end of the screw is employed for rotating the screw.

The inner mould includes ring members for forming coupling members at the ends of a pipe to be moulded. The ring 65 at the spigot end of the mould has an inwardly extending flange 66 which contacts with the end of the shell 41. The ring 65 is solid and its periphery is finished as a running or bearing surface 67 adapted to contact with all the rollers 11. This cylindrical surface 67 is on the exterior of a flange 68 which extends axially of the inner mould for a distance corresponding to the length of the spigot 69 of the pipe to be moulded.

The spigot surface of the pipe is formed by a split ring 70 which may be made in two semicircular segments so as to facilitate its removal from a moulded pipe. Each segment of the split ring 70 carries a plurality of pins 71 which are engaged in tapped holes in the segments. The pins extend through holes in the runner ring 65. The split ring 70 is held in position by wedges 72 which are driven through holes in the pins 71 to seat the split ring firmly against the runner ring. These wedges are removed before the runner ring 65 is removed from a molded pipe. After the ring 65 has been removed, the segments of the split ring 70 may be removed from the pipe. The interior of the split ring 70 may be cylindrical to mould a plain-surfaced spigot having a diameter substantially equal to the diameter of the bearing surface 73 of the spigot, but for moulding a gasket-retaining groove 74 the interior of the split ring is provided with an inwardly extending rib to form a circumferential groove.

A collapsible ring 75 engages the other end of the shell 41 and forms the shoulder 76 and the interior surface 77 of the bell 78 of the pipe. The ring 75 has an axially extending flange 79 for engaging the interior surface of the shell 41. The periphery of the ring 75 has a circumferential groove 80 which engages an inwardly projecting rib 81 on the interior of a solid runner ring 82. The ring 82 has a running or bearing surface 83 of a diameter equal to the diameter of the bearing surface 67 of the ring 65 and it engages the cylindrical bearing elements 84 of the rollers 11 when the mould is contained within the apparatus. The runner ring 82 has an outwardly extending portion 85 and an axially extending portion 86 whose interiors are shaped to mould the end and the exterior surfaces of the bell of the pipe.

The collapsible ring 75 is provided with a removable segment 88 which has to be removed for placing the ring 75 within the ring 82. The ring and segment are shown in Figs. 3–7 inclusive. The removable segment 88 has peripheral surfaces 89 which have the same curvatures as the peripheral surfaces of the collapsible ring 75. The ends of the segment are sloped to engage sloping surfaces 90 and 91 of the collapsible ring, and the cross-section of the segment corresponds to the cross-section of the collapsible ring. The segment has extending from its ends two stems 92 and 93 (Fig. 5), carrying bosses 94 and 95, respectively. A pair of bosses 96 and 97 are secured to the interior of the collapsible ring opposite the bosses 94 and 95, respectively. These bosses are drilled to receive pins 98 and 99 to hold the segment in assembled position on the ring.

Whenever it is desired to collapse the ring 75 the pins 98 and 99 are withdrawn and the segment 88 is lifted from its functioning position on the ring. The separated ends 100 and 101 of the ring 75, Fig. 6, can then be drawn toward each other for collapsing the ring. A tool having a handle 102 and links 103 and 104 may be used for this purpose. The links are pivotally connected to the tool and their free ends are drilled so that when the links are extended as shown in Figs. 6 and 7, the pins 98 and 99 may be passed through the holes in the bosses 96 and 97 and through holes at the ends of the links. By rotating the handle 102 clockwise, Fig. 6, the ends 100 and 101 of the collapsible ring 75 can be drawn towards each other and cause separation of the ring from the moulded pipe and from the runner ring 82.

The rings 65 and 70 at one end of the apparatus and the rings 75 and 82 at the other end of the apparatus constitute moulding rings for the ends of the pipe and supporting rings for the inner mould. They are held assembled to the shell 41 as by tie rods which pull the rings into contact with the ends of the shell. The tie rods may be connected to the rings in any suitable manner.

In order to hold the rings in abutting relationship to the ends of the shell 41, the ring 65 is provided with a plurality of cylindrical nuts 106 having enlarged heads 107 which are recessed for receiving a socket wrench, and a similar set of cylindrical nuts 108 are similarly mounted on the collapsible ring 75. The cylindrical nuts located opposite each other in the rings 65 and 75 are connected together by steel rods 109, and by rotating the nuts the rods 109 may be tensioned to any desired degree. The rods 109 extend longitudinally of the mould and by locating them outside of the shell 41 they remain within the moulded pipe and constitute pre-stressed longitudinal reinforcing rods in the fabricated pipe. In the drawings, four rods 109 are shown, but they may be provided in any number desired.

After the pipe has been moulded and the moulding material has set, the inner mould may be removed from the moulded pipe by first removing the cylindrical nuts 106 and 108 and then collapsing the collapsible ring 75 and the inner shell 41. The wedges 72 are withdrawn from the pins 71 and the runner ring 65 is removed. Thereafter the segments of the split ring 70 may be taken from the moulded pipe. The runner ring 82 is withdrawn axially from the pipe.

Figure 2:
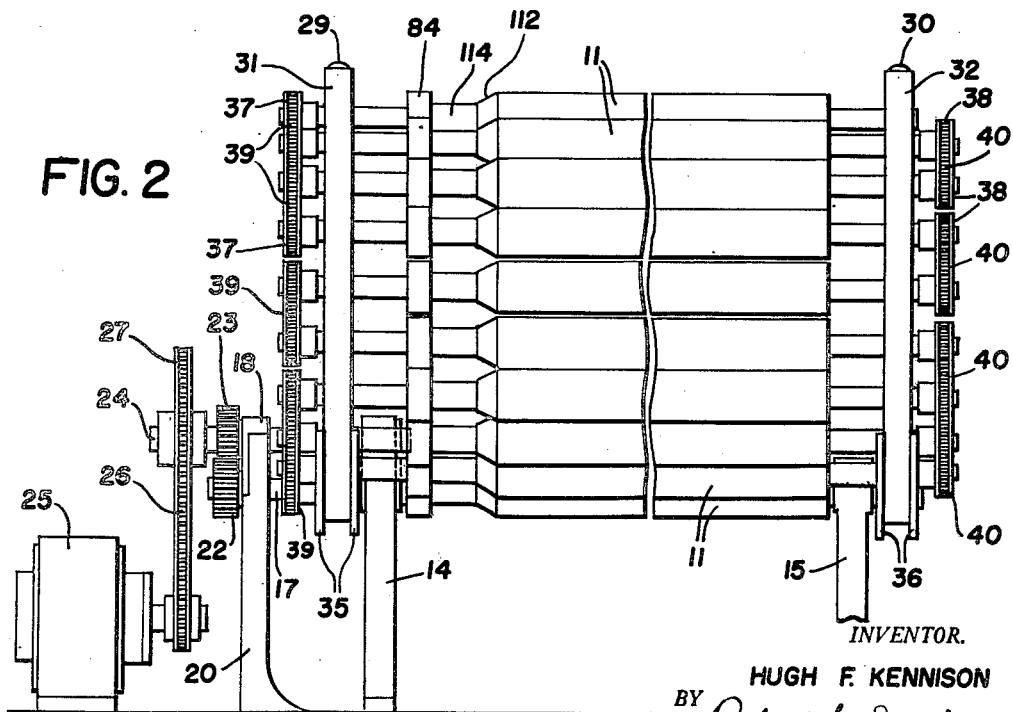
Fig. 2 is a side elevational view of the apparatus illustrated in Fig. 1.

The outer moulding mechanism comprises the rollers 11, Figs. 2 and 3, rotatably mounted in two sets of segments 12 and 13, Fig. 1. The axes of these rollers are parallel to each other and are so spaced in a circle concentric to the inner mould as to have the cylindrical forming surfaces 110 of adjacent rollers slightly spaced from each other. The forming surfaces 110 of the rollers form the exterior surface 111 of the pipe to be moulded and provide bearing surfaces for contacting with the peripheral surface 67 of the ring 65 at the spigot-forming end of the mould.

The other end of the forming surface 110 intersects with a laterally extending surface 112 by which a sloping surface 113 is formed to the rear of the bell of the pipe. The laterally extending surface 112 tapers down to a reduced shaft portion 114 of the roller which provides a free space for the accommodation of the bell forming portions 85 and 86 of the ring 82. The shape of the laterally extending surface is a matter of choice and it may have the configuration of any surface of revolution. Each roller has a bearing element 84 whose bearing surface 115 has a diameter equal to the diameter of the roller 11. The flange 86 on the runner ring 82 runs in the space between the bearing element 84 and the shoulder 116 at the base of the sloping surface 112 and serves to limit axial movement of the inner mould with respect to the rollers 11.

*Operation*

The inner mould, including the split cylinder or shell 41 and the spaced circular forms or rings by which the inner mould is supported and the ends of the pipe are shaped, is assembled as a unit. Preferably, the moulding surfaces of the inner mould are lubricated and a mixture of neat cement is applied thereover. This neat cement is applied over the moulding surfaces of the rings 65 and 70, and of the rings 75 and 82 and, if desired, the mould cavities within the rings 70 and 82 may be initially filled with the moulding mixture. The inner mould is placed onto the two lowermost rollers 11. The segments 12 and 13 are then closed, as illustrated in Figs. 1 and 2. The inward positions of the segments 12 and 13 are determined by the surfaces 110 and 115 of the rollers carried by the segments and the running surfaces 67 and 83 on the runner rings 65 and 82, respectively.

When the apparatus is readied, the motor is placed in operation and the rollers and the inner mould are rotated. The concrete or other plastic moulding material is poured or shovelled between the two uppermost of the rollers 11 and onto the rotating inner mould. As the quantity of the moulding material increases, the rotating rollers 11 compress and distribute it in such manner as to form the pipe. The rollers calender the exterior surface of the pipe. The density of the wall of the pipe is increased by the pressure exerted by the rotating rollers. After sufficient moulding material has been provided for forming a dense and well compacted pipe wall, the inner mould and the pipe is removed from the apparatus and the inner mould is stripped from the pipe.

By employing similar spigot forming rings 65 and 70, or similar bell forming rings 75 and 82, at both ends of the apparatus, and appropriately modifying the cooperating rollers 11, a double-end spigot pipe or a double-end bell pipe may be produced.

The principle of the invention, together with an apparatus for carrying out the principle has been described herein, but it is desired that it be understood that the apparatus disclosed is only illustrative, and that the invention can be carried out by other means. Also, while the apparatus is designed to employ the various features and elements in the combinations and relations described, some of these may be altered and others omitted without interfering with the more general results outlined and the invention within the scope of the appended claims incident to such use.

What is claimed is:

1. Apparatus for forming concrete pipes or the like comprising a mould having a cylindrical body and circular forms spaced from one another and extending outwardly from the cylindrical body and towards each other for forming coupling surfaces at the ends of a pipe to be moulded on the exterior of said cylindrical body and intermediate said circular forms, means for supporting said mould for rotation about a stationary axis, a plurality of rollers mounted concentrically about said cylindrical body and encircling the same except for a filling space between upper rollers, each of said rollers having surfaces of revolution for forming the exterior surface of a pipe to be moulded which lies between said circular forms of the mould, and means for rotating said rollers and said mould.

2. Apparatus for forming concrete pipes or the like comprising a mould having a cylindrical body and removably attached circular forms extending outwardly from the cylindrical body, said removable forms being constructed and arranged to mould the coupling elements at the ends of a pipe to be formed on the exterior of said cylindrical body and intermediate said circular forms, means rotatably supporting said mould, a plurality of rollers mounted about and substantially encompassing said mould with their axes lying in a circle concentric to the axis of the mould, each of said rollers having surfaces of revolution for forming the exterior surface of a pipe to be moulded which lies between said forms of the mould, and means for rotating said rollers and said cylindrical mould.

3. Apparatus for forming concrete pipes or the like comprising a mould having a cylindrical body and circular forms at the ends of the cylindrical body, said forms extending outwardly from the cylindrical body and terminating in wall portions substantially parallel to the exterior surface of the cylindrical body for forming coupling surfaces at the ends of a pipe to be moulded on the exterior of said cylindrical body and intermediate said circular forms, bearing surfaces carried by said circular forms, a plurality of rollers mounted about and substantially encompassing said mould, said rollers having bearing surfaces for engaging said bearing surfaces carried by said circular forms, said rollers being substantially equidistant from the exterior surface of the cylindrical body and at least two of said rollers supporting said mould, each of said rollers having forming surfaces for forming the exterior surface of a pipe to be moulded which lies between said circular forms of the mould, and means for rotating said rollers and said mould.

4. Apparatus for forming concrete pipes or the like comprising a mould including a cylindrical body and end rings removably mounted at the ends of said cylindrical body, means for holding said end rings and cylindrical body in assembled relationship, a runner ring engaging one of said end rings, a moulding ring engaging the second of said end rings, a plurality of rotatable rollers mounted about said mould with their axes lying in a circle concentric to the axis of the mould, each of said rollers having cylindrical surfaces for engaging cylindrical running surfaces on said runner ring and on the second of said end rings, said rollers having surfaces of revolution for forming the exterior surface of a pipe to be moulded, said pipe-forming surfaces extending between said runner ring and the running surface on the second of said end rings, and means for rotating said rollers and said mould.

5. Apparatus for forming concrete pipes or the like comprising a mould, said mould including a collapsible cylindrical shell, an end ring at each end of said collapsible shell, means for holding said end rings and shell in assembled relationship, a third ring engaging one of said end rings, said third ring and engaging end ring together providing a mould for forming a coupling element at one end of a pipe, a fourth ring engaging the second of said end rings, said fourth ring and said second end ring together providing a mould for forming a coupling element at the other end of a pipe, means rotatably supporting said mould and attached rings, a plurality of rollers mounted about said mould with their axes lying in a circle concentric to the axis of said mould, said rollers having surfaces of revolution extending between said third and fourth rings for forming the exterior of a pipe to be moulded, and means for rotating said rollers and said mould.

6. Apparatus for forming concrete pipes or the like comprising a mould, said mould including a collapsible cylindrical shell, an end ring at each end of said collapsible shell, means for holding said end rings and shell in assembled relationship, a third ring engaging one of said end rings, said third ring and engaging end ring together providing a mould cavity for forming the bell of a pipe, a fourth ring engaging the second of said end rings, said fourth ring and said second end ring together providing a mould for forming the spigot end of a pipe, means rotatably supporting said mould and attached rings, a plurality of rotatable rollers mounted about said mould with their axes lying in a circle concentric to the axis of said mould, said rollers having surfaces of revolution extending between said bell-forming mould cavity and said spigot-forming mould for forming the exterior of a pipe to be moulded, and means for rotating said rollers and said mould.

7. Apparatus for forming concrete pipes or the like comprising a mould, said mould including a collapsible cylindrical shell, a collapsible ring at one end of said collapsible shell an end ring at the other end of said collapsible shell, means for holding said collapsible ring and said end ring in assembled relationship with said shell, a runner ring engaging the exterior of said collapsible ring, said collapsible ring and said runner ring together providing a mould cavity for forming the bell of a pipe, spigot surface moulding means removably attached to said end ring, means rotatably supporting said mould, a plurality of rotatable rollers mounted about said mould with their axes lying in a circle concentric to the axis of said mould, said rollers having cylindrical surfaces of equal diameter for engaging running surfaces of equal diameter on said runner ring and said end ring, said rollers being provided with surfaces of revolution extending between said runner ring and said end ring, and means for rotating said rollers and said mould.

8. Apparatus for forming concrete pipes or the like comprising a collapsible cylindrical shell for receiving plastic moulding material onto its exterior, an end ring at each end of said collapsible shell, means for holding said end rings and said collapsible shell in assembled relationship, a third ring engaging one of said end rings and together providing a mould for forming a coupling element at one end of a pipe, means for disengaging said first end ring from said third ring, a fourth ring, said fourth ring and the second of said end rings together providing a mould for forming a coupling element at the other end of a pipe, means for demountably securing said fourth ring and said second end ring to each other, and roller means for forming the exterior surface of a pipe between its coupling elements, said roller means being spaced from said collapsible shell by cylindrical bearing surfaces on said third ring and on said second end ring.

9. Apparatus for forming concrete pipes or the like comprising a collapsible shell for receiving plastic moulding material onto its exterior, a pair of separable concentric rings for forming a coupling element at one end of a pipe to be moulded, a second pair of separable concentric rings for forming a coupling element at the other end of a pipe, one of the rings of each pair of rings having a cylindrical running surface, means for securing said pairs of concentric rings and said collapsible shell in assembled relationship, and roller means for forming the exterior surface of a pipe between said pairs of concentric rings, said roller means having cylindrical bearing surfaces of equal diameter for engaging the cylindrical running surfaces of said rings.

10. Apparatus for forming concrete pipes or the like comprising a collapsible shell for receiving plastic moulding material onto its exterior, a pair of demountably engaged concentric rings for forming a bell at one end of a pipe to be moulded, one of said rings being a runner ring and having a flange for forming the end and exterior of a bell and the other of said rings being collapsible for removal from said runner ring, a pair of demountably engaged concentric rings for forming a spigot at the other end of a pipe, one of said second pair of rings being a runner ring and the other of said rings having a broken surface for forming a grooved spigot surface on the exterior of a pipe, means for securing said pairs of concentric rings to the ends of said collapsible shell, and roller means for forming the exterior surface of a pipe between said pairs of concentric rings, said roller means having cylindrical bearing surfaces for engaging the running surfaces of said runner rings.

11. Apparatus for forming concrete pipes or the like comprising an inner mould, a plurality of rotatable rollers, means for supporting said rollers with their axes lying in a cylindrical surface concentric to the axis of said inner mould, said rollers having surfaces of revolution for calendering the exterior surface of a pipe to be moulded between said rollers and said inner mould, said inner mould including a cylindrical shell and a pair of rings attached to each of its ends for forming the ends of a pipe and for supporting the inner mould within the cylindrical surface formed by said rollers, one of said pairs of rings being shaped to form the bell of the pipe and the other of said pairs of rings being shaped to form the spigot of the pipe and each of said pairs of rings having running surfaces for engaging said rollers, said rollers having surfaces of revolution of equal diameter for engaging the running surfaces of said rings and a reduced shaft portion opposite the bell-forming portion of the bell-forming rings for accommodating the same, and means for rotating said rollers.

12. A mould for forming concrete pipes or the like comprising a longitudinally split cylinder for receiving plastic moulding material onto its exterior, said split cylinder being of less diameter than the inner diameter of a pipe to be moulded and expandable to the inner diameter of the pipe, an arch piece for bridging the span between the longitudinal edges of the split cylinder when the cylinder is expanded, rings for forming the ends of a pipe to be moulded outside of said cylinder, said rings being in abutting relationship with the ends of said cylinder and having flanges for holding the cylinder and the rings concentrically, and means for holding tie-rods connecting said end rings.

13. A mould for forming concrete pipes or the like comprising a collapsible shell for receiving plastic moulding material onto its exterior, said collapsible shell including a curvilinear plate with opposing longitudinal edges, said curvilinear plate being normally of less diameter than the inner diameter of a pipe to be moulded and expandable to the inner diameter of the pipe, an arch piece for bridging the span between the longitudinal edges of the curvilinear plate when the plate is expanded, rings for forming the ends of a pipe to be moulded outside of said shell, said rings being in abutting relationship with the ends of said shell and having flanges for holding the shell and the rings concentrically, the flange on one of said rings engaging the interior of said shell and said ring having a removable segment and means whereby said ring may be contracted when the segment is removed.

14. A mould for forming concrete pipes or the like comprising a longitudinally split cylinder for receiving plastic moulding material onto its exterior, said split cylinder normally being of less diameter than the inner diameter of a pipe to be moulded and expandable to the inner diameter of the pipe, an arch piece for bridging the span between the longitudinal edges of said split cylinder when the cylinder is expanded, and means for holding said arch piece in bridging position, said means comprising a parallel motion bar and links connecting said bar to said arch piece, said bar having rollers for supporting said bar against the interior of the cylinder diametrically opposite from the longitudinal edges of the cylinder.

15. A mould for forming the interior and ends of a concrete pipe, comprising a cylindrical shell for receiving plastic material on its exterior, a pair of separable rings for forming a coupling element at one end of a pipe to be moulded against the exterior of said collapsible shell, a second pair of separable rings for forming a coupling element at the other end of the pipe, one of the rings of each pair of said rings having a cylindrical running surface whereby said pairs of rings and said cylindrical shell may be rotated, and means for holding members for securing said pairs of separable rings and cylindrical shell in assembled relationship.

16. A mould for forming the interior and ends of a concrete pipe, comprising a collapsible cylindrical shell for receiving plastic material on its exterior, a collapsible ring mounted to one end of said collapsible shell and having a surface for receiving plastic material on its exterior, a solid ring locked in engagement with said collapsible ring, said solid ring having a flanged portion for forming the end and exterior surfaces of a bell for a pipe to be moulded against said shell, a solid ring mounted to the other end of said shell, said second solid ring having a flange spaced from the exterior of said shell, removable forms attached to the interior of said flange, said forms being shaped to mould the exterior surface of a spigot for the pipe, and means for holding members for holding said collapsible ring and said second-named solid ring in mounted relationship to said shell.

17. A mould for forming the interior and ends of a concrete pipe, comprising a collapsible shell for receiving plastic material on its exterior, a pair of demountably engaged rings for forming a bell at one end of a pipe to be moulded on the exterior of said collapsible shell, one of said rings having an exterior bearing surface and a flanged portion for forming the end and exterior of a bell and the other of said rings having an exterior surface for forming the interior of the bell, a second pair of demountably engaged rings for forming a spigot at the other end of the pipe, one of said second pair of rings having an exterior bearing surface and the other of said second pair of rings having an interior surface for forming a spigot surface on the exterior of the pipe, and means for holding members for securing said pairs of rings to the ends of said collapsible shell.

HUGH F. KENNISON.

REFERENCES CITED

The following references are of record in the file of this patent:

UNITED STATES PATENTS

| Number | Name | Date |
| --- | --- | --- |
| 1,757,487 | Soule | May 6, 1930 |
| 1,997,232 | Richards | Apr. 9, 1935 |
| 2,001,237 | Bille | May 14, 1935 |
| 2,283,921 | Ferla | May 26, 1942 |